United States Patent [19]

Meier

[11] 4,352,950

[45] Oct. 5, 1982

[54] CONNECTION DEVICE FOR A SCREENED CABLE

[75] Inventor: Walter Meier, Zollikon, Switzerland

[73] Assignee: Contraves AG, Zurich, Switzerland

[21] Appl. No.: 226,207

[22] Filed: Jan. 19, 1981

[30] Foreign Application Priority Data

Feb. 25, 1980 [CH] Switzerland .................... 1466/80

[51] Int. Cl.³ ............................................. H01R 17/00
[52] U.S. Cl. ............................... 174/35 C; 174/65 SS;
174/75 C; 174/89
[58] Field of Search ............... 174/35 C, 65 SS, 75 C,
174/78, 89; 339/89 C, 143 R

[56] References Cited

U.S. PATENT DOCUMENTS

| 2,673,233 | 3/1954 | Salisbury et al. | 174/88 C |
| 2,805,399 | 9/1957 | Leeper | 333/136 |
| 3,136,843 | 6/1964 | Pomerantz et al. | 174/75 C X |
| 3,609,651 | 9/1971 | Sladek et al. | 339/177 E |
| 3,769,444 | 10/1973 | Malik | 174/75 C |

FOREIGN PATENT DOCUMENTS

| 863370 | 4/1952 | Fed. Rep. of Germany . |
| 1075699 | 2/1960 | Fed. Rep. of Germany . |
| 1540280 | 1/1970 | Fed. Rep. of Germany . |
| 1162928 | 4/1958 | France . |
| 1284648 | 1/1962 | France . |
| 1439160 | 4/1966 | France . |
| 2140193 | 1/1973 | France . |

Primary Examiner—Roy N. Envall, Jr.
Attorney, Agent, or Firm—Werner W. Kleeman

[57] ABSTRACT

A radiation tight connection device for a cable containing a screening mesh or wire which is fixed by clamping. An insert equipped with an insert cone and a collar formed thereat is inserted substantially axially parallel in a conical bore of a screw cap or retaining nut. Provided at the insert cone is an external or outer conical contact surface which corresponds to or is complementary to an inner contact surface of the conical bore of the retaining nut. During assembly the screening wire or mesh is fixed by clamping between both of the contact surfaces. The invention preferably is used in conjunction with plugs or the like.

5 Claims, 4 Drawing Figures

CONNECTION DEVICE FOR A SCREENED CABLE

BACKGROUND OF THE INVENTION

The present invention relates to a new and improved construction of a connection device for a screened or shielded cable.

In its more particular aspects the invention relates to a new and improved construction of radiation tight connection device for a cable containing a screening mesh or meshwork (wire) which is fixed by clamping, wherein an insert or insert member equipped with an insert cone and having a collar formed thereat is inserted substantially axially parallel into a conical bore of a retaining nut or screw cap or the like.

In order to prevent superimposing of signals carried by a line or conductor by signals externally of the line there are frequently used cable screening or shielding devices formed of metal mesh or wires. Such shields or screens are of growing importance due to the increased sensitivity of the employed equipment. In military applications and particularly when working with military hardware, it is additionally necessary to protect the critical lines not only against the usual electromagnetic disturbances, but also against the forces of so-called electro-magnetic pulses (EMP). These pulses are generated, for instance, by nuclear explosions and can exceed intensities of several thousand volts.

In the case of connection devices the transition locations between the screening mesh or wire and stationary parts of the equipment frequently constitute the locations where disturbances arise. During combing out of the screening meshwork or wires at the connection devices frequently there are formed openings which cause electromagnetic untightness or leakiness. Also, soldering operations performed during connection of the screening or shielding meshwork, due to the thermal action, frequently constitute the cause of fracture locations at the screening meshwork.

In U.S. Pat. No. 3,889,046 there is taught to the art a connection device for a shielded or screened cable which, apart from containing other components, contemplates the provision of four flat metal rings equipped with eccentric openings. These metallic rings are pressed by clamping screws against the screening meshwork or wire which is placed over a cone. Due to the offset arranged openings of the metallic rings the meshwork is pressed with different pressures against the cone. Apart from the complicated construction, with this design of connection device there is present an appreciable fracture or rupture danger due to the pronounced loading of fine screening meshworks or wires.

In German Pat. No. 2,343,030 there is taught to the art a releasable connection device for a coaxial cable having solid or air space insulation between the inner conductor and the sheathed outer conductor or line. For purposes of fixing the outer line there is provided a clamping screw, wherein apart from the provision of a retaining nut there is contemplated the use of an insert member or insert having two external threads as well as a supporting sleeve which is attached by being screwed onto the protective jacket. This device which is provided for coaxial cables contains a multiplicity of constructional elements which are superfluous for the connection of shielding meshworks or wires, and therefore is quite expensive.

SUMMARY OF THE INVENTION

Therefore, with the foregoing in mind, it is a primary object of the present invention to provide a new and improved construction of a connection device for a screened or shielded cable which is not associated with the aforementioned drawbacks and limitations of the prior art proposals.

Another and more specific object of the present invention aims at providing a new and improved construction of connection device of the previously mentioned type, wherein the connected screening meshwork or equivalent shielding structure can be fixed without deformation even when encountering pronounced loads caused, for instance, by shock, impact and vibrations.

Still a further significant object of the present invention is to provide an improved connection device of the character described which is low ohmic, exhibits tightness to high frequencies and can be advantageously used in military applications.

A further important object is to provide a new and improved connection device for a screened or shielded cable which is economical to manufacture and, furthermore, allows for unproblematic assembly and repair of the connection device which itself contains as few parts as necessary.

Now in order to implement these and still further objects of the invention, which will become more readily apparent as the description proceeds, the connection device for a screened or shielded cable as contemplated by the invention, is manifested by the features that at the insert cone there is provided a conical contact or support surface which is substantially complimentary to the contact or support surface of the conical bore of the retaining nut or the like. The meshed screening wire or meshwork exclusively is fixed in position by clamping the same between both of these contact or support surfaces.

The inventive connection device renders possible, by virtue of the few number of employed individual parts as well as the advantageous construction and configuration of such parts, fabrication of the connection device in a most economical manner and simple assembly thereof. What is further advantageous is that the screening meshwork need not be combed out and soldered, and that there is obtained a good HF-tightness and a small transition resistance to the housing.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
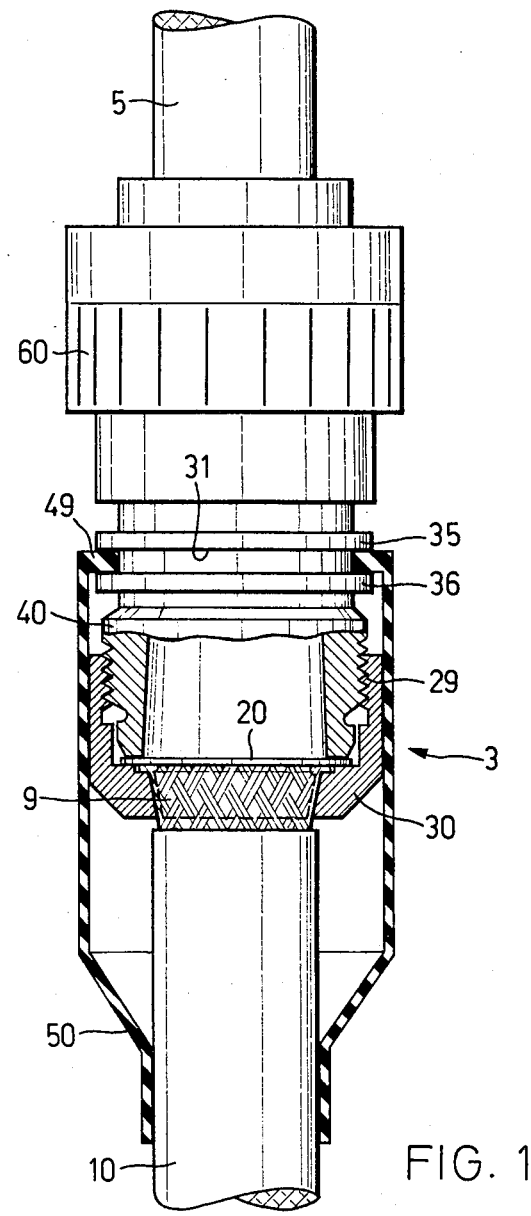
FIG. 1 illustrates in enlarged side view the assembled connection device of the invention, with certain components thereof shown in longitudinal sectional view to improve the illustration.

Describing now the drawings, in FIG. 1 there is shown an exemplary embodiment of the inventive connection device 3 in its assembled condition as well as the thereto connected cables 10 and 5, the hot shrunk molded part 50 and the plug contact part or portion 60. The connection device 3 consists only of three individual parts or components: the insert or insert member 20, the retaining nut or screw cap 30 and the plug-end housing 40. The connection device 3 is surrounded by the substantially cylindrical hot shrunk molded part 50 which engages at one end by means of a radially inwardly directed collar 49 into a groove 31 of the plug-end housing 40 and conically tapers towards the other end in the direction of the cable 10 where it tightly encircles the same. Due to the hot shrunk molded portion or part 50 the encapsulated cable 10 is fixed securely against displacement in the lengthwise direction with respect to the connection device 3.

Figure 2:
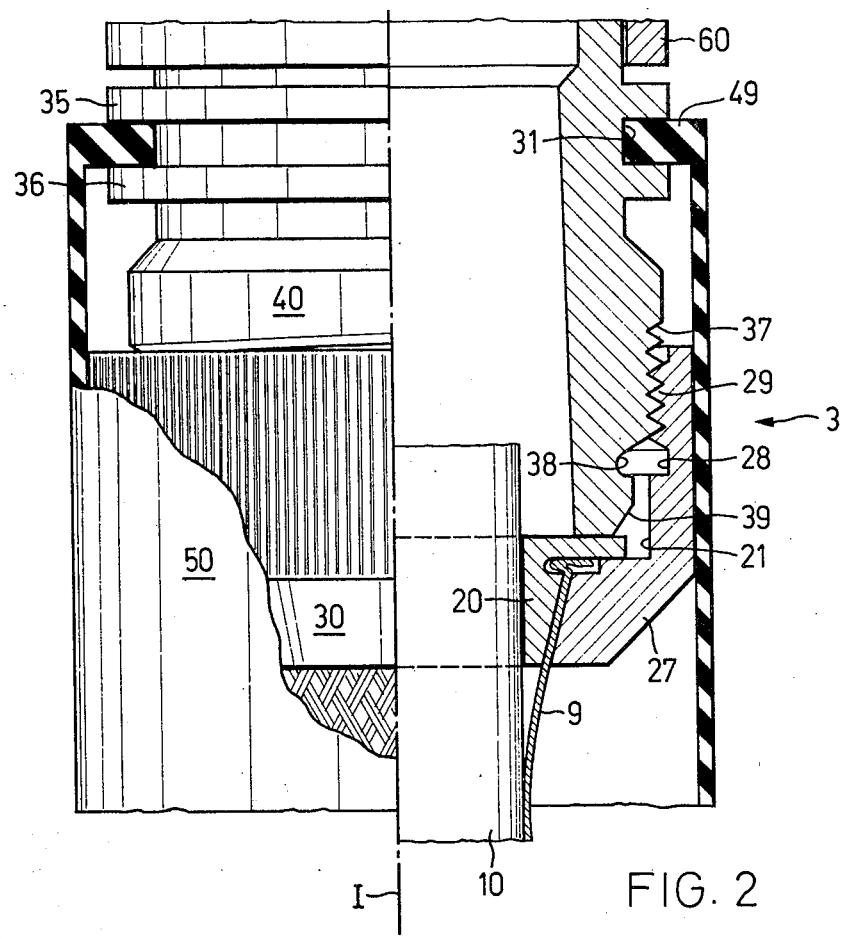
FIG. 2 is a side view of the assembled connection device in partial sectional view and partial slotted shrunk molded part.
Figure 3:
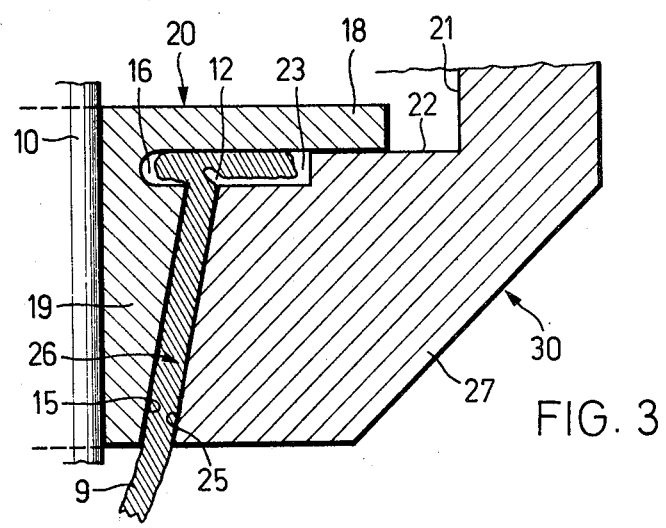
FIG. 3 is an enlarged sectional view of the arrangement of FIG. 2.

FIGS. 2 and 3 illustrate in greater detail the connection of the screening or shielding meshwork 9 or equivalent shielding device with the connection device 3. The insert member 20 consists of an insert cone 19 and the thereat formed radially outwardly directed collar 18 which is offset by means of a ring-shaped recess 16 from the insert cone 19. This insert cone 19 is bounded by a conical contact or support surface 15 which tapers away from the collar or collar member 18. The inclination of the cone-shaped contact surface 15 towards the cone axis corresponds to that of the known Morse cone i.e. cone-shaped parts having small cone angles, usually 3° or less. The insert member 20 is inserted into a conical bore 26 of the retaining nut 30, and the collar 18 bears against a contact or support surface 22 of such retaining nut 30. The retaining nut or screw cap 30 or equivalent structure possesses a non-continuous cylindrical bore 21 (FIGS. 3 and 4) having internal threads or threading 29 and a conical flange 27 which is offset by a recess 28 from the inner threads 29 (FIG. 2). This conical flange 27 is directed radially inwardly and possesses the substantially conical bore 26. This bore 26 is bounded by an axially outwardly tapering contact or support surface 25. The contact or support surface 22, which is disposed perpendicular to the axis of rotation I, is offset by a recess 23 from the conical contact or support surface 25.

Between the contact surface 15 and the contact surface 25 there is clamped the enlarged or widened screening meshwork or wire 9 or equivalent shielding structure, wherein the end of the screening meshwork 9 impacts against the collar 18 of the insert member or insert 20. The recess 16 of the insert 20 and the recess 23 of the retaining nut 30 enclose a substantially torous-shaped channel 12 which can house the parts of the screening or shielding meshwork 9. With pressed-in insert member 20 the screening meshwork 9 can be fixed at the connection device 3 without any additional securing arrangement.

The plug-end housing 40 is formed to be essentially cylindrical in shape and consists of the ring-shaped contact or support element 39, the outer threads 37 which are offset or spaced from the contact element or portion 39 by a circular groove 38, and both of the thereat formed rings or ring members 36 and 35 which are separated from one another by a groove or channel 31.

Figure 4:
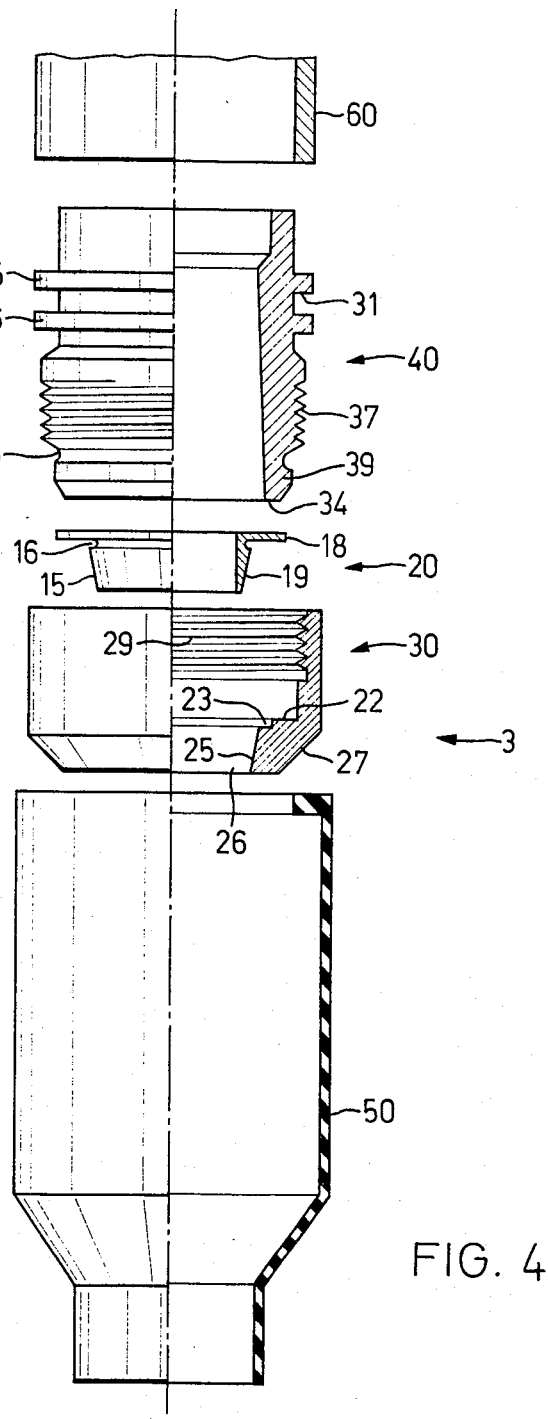
FIG. 4 is a side view of the connection device showing the individual components or parts in exploded or spaced relationship.

FIG. 4 shows in half sectional view the parts of the connection device 3 which here have been shown in spaced relationship from one another, i.e. in exploded view, to improve clarity in the illustration, and further schematically shows the hot shrunk molded part 50 and the plug-contact portion 60.

During the assembly the expanded or enlarged screening meshwork 9 is placed over the insert cone 19 until it comes into contact with the collar 18. The insert member 20 is pressed into the conical bore 26 of the retaining nut 30 until the collar 18 bears against the contact or support surface 22. The parts of the screening meshwork 9 which protrude past the contact or support surface 25 collect in the channel 12. The plug-end housing 40 is threaded into the retaining nut 30 until the contact or support element 39 bears by means of its front surface 34 upon the collar 18, and thus, ensures for an additional securing of the connection device 3.

Thereafter the hot shrunk molded part or portion 50 is mounted in conventional manner over the connection device 3, thereby achieving protection against the effects of moisture, dust and mechanical action.

While there are shown and described present preferred embodiments of the invention, it is to be distinctly understood that the invention is not limited thereto, but may be otherwise variously embodied and practiced within the scope of the following claims. Accordingly,

What is claimed is:

1. A radiation tight connection device for a cable having a shielding meshwork fixed by clamping, comprising:
   an insert member equipped with an insert cone;
   a collar formed at the insert cone;
   a retaining nut having a substantially conical bore;
   said insert member being inserted into the conical bore of said retaining nut;
   a substantially conical contact surface provided at said insert cone;
   said conical bore of said retaining nut having a contact surface;
   the conical contact surface of the insert cone essentially corresponding to the contact surface of the conical bore of the retaining nut; and
   the shielding meshwork exclusively being fixedly retained between both of said contact surfaces by clamping thereof.

2. The connection device as defined in claim 1, wherein:
   the contact surface of the insert cone and the contact surface of the retaining nut define respective Morse cones.

3. The connection device as defined in claim 2, wherein:
   the collar of the insert cone is offset by a substantially ring-shaped recess from the conical contact surface of the insert cone.

4. The connection device as defined in claim 2, wherein:
   said retaining nut has a recess;
   said insert member having a recess; and
   in the assembled condition of the connection device the recess of the retaining nut and the recess of the insert member defining a substantially torous-shaped channel for receiving part of the shielding meshwork.

5. The connection device as defined in claim 1, further including:
   a plug-end housing threadably connected into the retaining nut for additionally fixing the insert member.

* * * * *